United States Patent
Rasolzadeh et al.

(10) Patent No.: US 9,224,097 B2
(45) Date of Patent: Dec. 29, 2015

(54) NONLINEAR CLASSIFICATION OF DATA

(75) Inventors: Babak Rasolzadeh, Solna (SE); Oscar Mattias Danielsson, Stockholm (SE)

(73) Assignee: Meltwater Sweden AB, Stockholm (SE)

( * ) Notice: Subject to any disclaimer, the term of this patent is extended or adjusted under 35 U.S.C. 154(b) by 199 days.

(21) Appl. No.: 14/124,081

(22) PCT Filed: Jun. 5, 2012

(86) PCT No.: PCT/SE2012/050597
§ 371 (c)(1),
(2), (4) Date: Dec. 5, 2013

(87) PCT Pub. No.: WO2012/169955
PCT Pub. Date: Dec. 13, 2012

(65) Prior Publication Data
US 2015/0081600 A1 Mar. 19, 2015

(30) Foreign Application Priority Data

Jun. 10, 2011 (SE) ........................ 1150532

(51) Int. Cl.
G06F 15/18 (2006.01)
G06F 17/30 (2006.01)
G06N 99/00 (2010.01)
G06K 9/62 (2006.01)
G06N 5/04 (2006.01)

(52) U.S. Cl.
CPC ............ *G06N 5/04* (2013.01); *G06F 17/30598* (2013.01); *G06K 9/6228* (2013.01); *G06K 9/6256* (2013.01); *G06N 99/005* (2013.01)

(58) Field of Classification Search
None
See application file for complete search history.

(56) References Cited

U.S. PATENT DOCUMENTS

2008/0304714 A1 12/2008 Lu et al.

OTHER PUBLICATIONS

Mita et al, Discriminative Feature Co-occurrence Selection for Object Detection, 2007.*
Mitsui et al, Object Detection by Joint Features based on Two-Stage Boosting, 2009.*
Ouyang et al, Boosting Relative Spaces for Categorizing Objects with Large Intra-Class Variation, 2008.*
Wu et al, Cluster Boosted Tree Classifier for Multi-View, Multi-Pose Object Detection, 2007.*
Yamauchi et al, Feature Co-Occurrence Representation Based on Boosting for Object Detection, 2010.*

(Continued)

*Primary Examiner* — Li-Wu Chang
*Assistant Examiner* — Mikayla Chubb
(74) *Attorney, Agent, or Firm* — Morgan, Lewis & Bockius LLP

(57) ABSTRACT

The present invention relates to a method for nonlinear classification of high dimensional data by means of boosting, whereby a target class with significant intra-class variation is classified against a large background class, where the boosting algorithm produces a strong classifier, the strong classifier being a linear combination of weak classifiers. The present invention specifically teaches that weak classifiers classifiers $h_1$, $h_2$, that individually more often than not generate a positive on instances within the target class and a negative on instances outside of the target class, but that never generate a positive simultaneously on one and the same target instance, are categorized as a group of anti-correlated classifiers, and that the occurrence of anti-correlated classifiers from the same group will generate a negative.

19 Claims, 1 Drawing Sheet

(56) References Cited

OTHER PUBLICATIONS

Hsu et al.; Relationship Between Diversity and Correlation in Multi-Classifier Systems, *Advances in Knowledge Discovery and Data Mining*, vol. 6119, pp. 500-506 (Jun. 21, 2010).

Windeatt, "Diversity measures for multiple classifier system analysis and design," *Information Fusion*, vol. 6, No. 1, pp. 21-36 (Mar. 1, 2005).

Wang et al.; "Negative Correlation Learning for Classification Ensembles," 2010 International Joint Conference on Neural Networks (IJCNN), IEEE, pp. 1-8 (Jul. 18, 2010).

Alam et al., "Combining Boosting with Negative Correlation Learning for Training Neural Network Ensembles," International Conference on Information and Communication Technology, (ICICT '07), IEEE, pp. 68-71 (Mar. 7-9, 2007).

Danielsson et al.; "Gated Classifiers: Boosting under High Intra-Class Variation," *Computer Vision and Pattern Recognition*, 2011 IEEE Conference, pp. 2673-2680 (Jun. 20, 2011).

Y. Freund et al.; "A Decision-Theoretic Generalization of On-Line Learning and an Application to Boosting," *Journal of Computer and System Sciences*, vol. 55, pp. 119-139 (1997).

P. Viola, et al.; "Robust Real-time Object Detection," *International Journal of Computer Vision*, pp. 1-25 (2002).

S.Z. Li, et al.; "Floatboost Learning and statistical Face Detection," *IEEE Transactions on Pattern Analysis and Machine Intelligence*, vol. 26. , No. 9, pp. 1112-1123 (Sep. 2004).

I. Laptev, "Improving object detection with boosted histograms," *Image and Vision Computing*, vol. 27, pp. 535-544 (2009).

B. Rasolzadeh, et al.; "Response Binning: Improved Weak Classifiers for Boosting," IEEE Intelligent Vehicles Symposium, Tokyo, Japan, Jun. 13-15, 2006.

Notification of International Preliminary Report on Patentability dated Dec. 10, 2013 and Written Opinion dated Oct. 17, 2012 for International Patent Application No. PCT/SE2012/050597.

\* cited by examiner

NONLINEAR CLASSIFICATION OF DATA

TECHNICAL FIELD

The present invention relates to a method for nonlinear classification of high dimensional data by means of boosting, whereby a target class with significant intra-class variation is classified against a large background class, where the boosting algorithm produces a strong classifier, the strong classifier being a linear combination of weak classifiers. The present invention also relates to a system and a computer program product adapted to function according to the inventive method.

BACKGROUND ART

Nonlinear classification of high dimensional data is a challenging problem. While designing such a classifier is difficult, boosting learning methods provide an effective stage-wise approach. It is known that if weak classifiers can perform better than chance on every distribution over the training set, AdaBoost can provably achieve arbitrarily good generalization bound, as can be seen in the publication "A decision-theoretic generalization of on-line learning and an application to boosting" by Y. Freund and R. E. Schapire found in Journal of Computer and System Sciences, 55:119 139, 1997.

The publication "Robust real-time object detection" by P. Viola and M. Jones found in International Journal of Computer Vision, 2002 is a very demonstrating paper in applications of AdaBoost for detection discriminancy.

However, despite the great success that AdaBoost and its descendant algorithms has seen in both theory and application, using AdaBoost to classify a target class with significant intra-class variation against a large background class remains a very challenging problem. For example, if viewpoint variation is introduced into the problem of face detection, known methods can no longer be used out of the box. AdaBoost will learn a linear combination of weak classifiers that are common on the target class, resulting in a model that gets increasingly "blurry" with more intra-class variation. The problem is that eventually combinations of weak classifiers that never occur together on any example of the target class will generate false positives. For example, two different weak classifiers representing pairs of eyes in different locations will result in the situation where having two pairs of eyes gives higher face score than having only one pair of eyes.

There are of course many ways of dealing with intra-class variation. Some examples include the following three strategies:

- training separate detectors for different subsets of the target class or training detector pyramids, as described in publication "Floatboost learning and statistical face detection" by S. Z. Li and Z. Zhang found in IEEE Transactions on Pattern Analysis and Machine Intelligence, 26:1112 1123, 2004,
- constructing image features that better separate the target class from the back ground, as described in publication "Improving object detection with boosted histograms" by I. Laptev found in Image and Vision Computing, 27:535-544, 2009, and
- improving the weak classifiers, e.g. using decision trees instead of stumps or selecting better thresholds as described in publication "Response binning: Improved weak classifiers for boosting" by B. Rasolzadeh, L. Petersson, and N. Pettersson found in IEEE Intelligent Vehicles Symposium, 2006.

SUMMARY OF THE PRESENT INVENTION

With the purpose of solving above problems, and on the basis of prior art such as it has been shown above and the indicated technical field, the present invention propose a way of directly addressing this problem within the AdaBoost framework.

The proposed solution is named gated classifiers, where the main idea, if used with AdaBoost, is that after a number of rounds of AdaBoost training, when there is a "blurry" model of the target class, it would be instrumental to make available to the learner a derived family of weak classifiers that are able to suppress such combinations of already learnt weak classifiers that cause false positives. Gated classifiers can be built by combining sets of already learnt weak classifiers using networks of logic gates and can be regarded as a singular (primitive) weak classifier within the boosting framework. Thus the conditions of the AdaBoost convergence proof, as described by Freund et al, are not violated.

From the standpoint of the technical field as defined above, the present invention more specifically teach that weak classifiers that individually more often than not generate a positive on instances within the target class and a negative on instances outside of the target class, but that never generate a positive simultaneously on one and the same target instance, are categorized as a group of anti-correlated classifiers, and that the occurrence of anti-correlated classifiers from the same group will generate a negative.

It is proposed that a negative is generated if two anti-correlated classifiers occur for the same object.

If for instance the weak classifiers $h_1$ and $h_2$ are categorized as anti-correlated classifiers, then it is proposed that a new gated classifier $h_3$ is a so called paired gated classifier, where $h_3(x) = \neg(h_1(x) \wedge h_2(x))$.

A negative is generated if any subset of anti-correlated classifiers occurs for the same object.

According to one proposed embodiment it is proposed that the weak classifiers $h_{j1}$ to $h_{jn}$ are categorized as anti-correlated classifiers, and that a new gated classifier $h_{NAND}$ is a so called NAND-classifier, where $$h_{NAND}(x) = \neg(h_{j1}(x) \wedge \ldots \wedge h_{jn}(x))$$

and where $j_1, \ldots, j_n \in \{1, \ldots, t-1\}$ and t is the current round of boosting.

According to another proposed embodiment of the present invention it is proposed that the weak classifiers $h_{j1}$ to $h_{jn}$ are categorized as anti-correlated classifiers, and that a new gated classifier $h_{XOR}$ is a so called XOR-classifier, where $$h_{XOR}(x) = \neg(h_{j1}(x) \wedge \ldots \wedge h_{jn}(x))$$

$$\wedge (h_{j1}(x) \vee \ldots \vee h_{jn}(x))$$

and where $j_1, \ldots, j_n \in \{1, \ldots, t-1\}$ and t is the current round of boosting.

It is also proposed that two trivial classifiers, here called the tautology classifier $h_T(x)=1$ and the falsum classifier $h_\phi(x)=0$, are defined, where these two trivial classifiers can be used in a training phase, and that if the weight distribution gets too uneven toward either positive of negative objects, one of these classifiers will get selected and then objects will get reweighted so that unevenness is reduced. These trivial classifiers do not have to be saved during training.

It is proposed that separate detectors are trained for different subsets of the target class, and that the training of detector pyramids is possible.

The inventive method can be used for different kind of data. One proposed embodiment is to use the method for image detection, in which case the construction of image features that gives a good separation of said target class from the background is proposed.

The present invention can be used in combination with other methods in order to improve the weak classifiers, such as the use of decision trees or the selection of better thresholds.

It is proposed that the inventive method is used together with AdaBoost.

The present invention also relates to a system for nonlinear classification of high dimensional data by means of boosting, the system being adapted to classify a target class with significant intra-class variation against a large background class, where the system comprises a processor adapted to use a boosting algorithm to produce a strong classifier where the strong classifier is a linear combination of weak classifiers.

The present invention specifically teaches that the system is adapted to perform the inventive method.

It is proposed that the system comprises a hardware adapted to manage the anti-correlated classifiers according to the inventive method. This hardware can for instance be, or comprise, one or several field programmable gate arrays.

An inventive system can be used in different implementations, and one proposed embodiment teaches that the system is a part of a camera or other ubiquitous equipment.

The present invention also relates to a computer program product comprising computer program code which, when executed by a computer, will enable the computer to perform the inventive method.

ADVANTAGES

The advantages that foremost may be associated with gated classifiers according to the present invention are that gated classifiers are easy to implement and will only require small changes to any existing AdaBoost code. Gated classifiers increase the ability of the strong classifier to handle intra-class variation while keeping it compact and efficient and with a minimal increase in the risk of over-fitting.

Gated classifiers can be used together with any of the three strategies for dealing with intra-class variation mentioned in the background art.

The inventive method reduces the required number of weak classifiers by almost an order of magnitude, which in turn yields faster detectors. Gated classifiers enable more complex distributions to be represented and they will extend the usefulness of boosted classifier cascades.

BRIEF DESCRIPTION OF THE DRAWINGS

A method, a system and a computer program product according to the present invention will now be described in detail with reference to the accompanying drawings, in which.

DETAILED DESCRIPTION OF PREFERRED EMBODIMENTS

In order to define the basic notation of the present invention the AdaBoost algorithm will be described, closely following Freund et al. The input to the learner is a set of training examples $\{(x_i, y_i)|i \in I\}$, where $x_i \in \chi$ is a feature vector and $y_i \in y = \{0,1\}$ is the corresponding label. The algorithm maintains an importance distribution over the training examples and $D_t(i)$ denotes the weight on the ith example at round t.

The classification function of the strong classifier, $H(x) = \Sigma_{t=1}^T \alpha_t h_t(x)$, is a linear combination of the classification functions of the weak classifiers. The classification function is thresholded to determine class membership.

The AdaBoost algorithm is as follows:

Require: $\{(x_i, y_i)|i \in I\}$, T
Initialize $D_1(i) = 1/|I|$
for t = 1 to T do
    Train $h_t : \chi \rightarrow y$ using distribution $D_t$
    Choose $\alpha \in \mathbb{R}$
    $D_{t+1} \leftarrow$ update weight distribution
end for
return $\{\alpha_1, ..., \alpha_T\}, \{h_1, ..., h_T\}$ The goal of the weak classifier $h_t$ is to minimize the weighted classification error, $\epsilon_t$:

$$\epsilon_t = P_{i \sim D_t}(h_t(x_i) \neq y_i) = \sum_{i \in I|(h_t(x_i) \neq y_i)} D_t(i)$$

In practice this typically boils down to: (1) defining a large pool of candidate classifiers, (2) evaluating $\epsilon_t$ for each candidate classifier in the pool and (3) selecting the one that yields the smallest error.

Candidate classifiers are typically "simple", i.e. they are defined by very few parameters and have very limited representational flexibility. This decreases the risk of over-fitting. A common choice of classifier is the decision stump, a decision tree with unit depth.

The strong classifier captures first-order statistics of weak classifier responses. In cases where the target class exhibits significant intra-class variation and the background class "interferes" with the target class in the relevant feature space, first-order statistics may not be sufficient to separate the target class from the background. In the following an example of this will be given and a simple solution suggested.

An example will now be used to illustrate why first-order weak classifier occurrence statistics may not be sufficient to capture target classes with significant intraclass variation.

Figure 1:
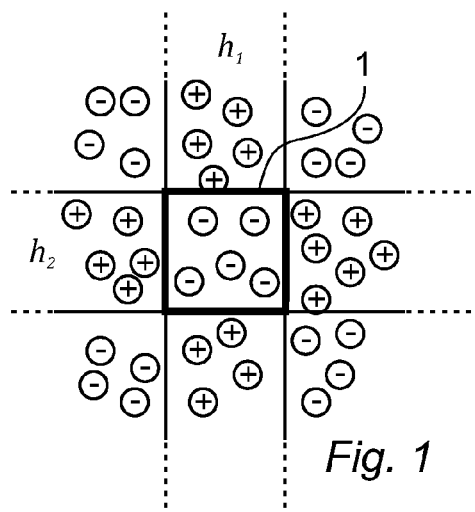
FIG. 1 shows schematically a two dimensional representation of a number of training examples and a pool of two weak classifiers.

FIG. 1 illustrates a number of training examples represented in a two dimensional feature space. The figure illustrates a pool of two weak classifiers, $h_1$ and $h_2$, each having a region in feature space which it classifies as positive. It can be seen that there is no way to linearly combine $h_1$ and $h_2$ so that the negative examples within the thick-lined frame 1 in the center and the positive examples get correctly classified. However, $h_1$ and $h_2$ are strongly correlated on the negative examples, while being anti-correlated on the positive examples.

It is thus proposed by the present invention that weak classifiers that individually more often than not generate a positive on instances within the target class and a negative on instances outside of the target class, but that never generate a positive simultaneously on one and the same target instance, are categorized as a group of anti-correlated classifiers, and that the occurrence of anti-correlated classifiers from the same group will generate a negative.

A negative is generated if two anti-correlated classifiers occur for the same object.

According to one embodiment, taking the example above into consideration it is proposed that the weak classifiers $h_1$ and $h_2$ are categorized as anti-correlated classifiers, and that a new gated classifier $h_3$ is a so called paired gated classifier, where $h_3(x) \neg = (h_1(x) \wedge h_2(x))$, and where $h_3$ captures second-order weak classifier occurrence statistics.

This type of situation arises whenever two weak classifiers are likely to occur on an object of the target class but never occur together. Some examples include: (1) the arm of a pedestrian may be raised or lowered but not both at the same time, (2) the handle of a mug may be round or square but not both and (3) a face may be brighter or darker than the background but not both.

It does not necessarily have to be two anti-correlated classifiers that occur at the same object, it should be understood that a negative is generated if any subset of anti-correlated classifiers occur for the same object.

Three different types of gated classifiers will now be defined, however, it should be understood that other types of gated classifiers can be defined similarly and that networks of gated classifiers can easily be constructed.

A first type of gated classifier is the NAND-classifier, $h_{NAND}$, where the weak classifiers $h_{j1}$ to $h_{j2}$ are categorized as anti-correlated classifiers, where $$h_{NAND}(x) = \neg(h_{j1}(x) \wedge \ldots \wedge h_{jn}(x))$$

and where $j_1, \ldots, j_n \in \{1, \ldots, t-1\}$ and t is the current round of boosting.

A second kind of gated classifier is the XOR-classifier, $h_{XOR}$, where the weak classifiers $h_{j1}$ to $h_{jn}$ are categorized as anti-correlated classifiers, where $$h_{XOR}(x) = \neg(h_{j1}(x) \wedge \ldots \wedge h_{jn}(x))$$
$$\wedge (h_{j1}(x) \vee \ldots \vee h_{jn}(x))$$

and where $j_1, \ldots, j_n \in \{1, \ldots, t-1\}$ and t is the current round of boosting.

A third kind of gated classifier are two trivial classifiers, here called the tautology classifier $h_T(x)=1$ and the falsum classifier $h_\phi(x)=0$. While these classifiers do not affect the contrast between the values of the classification function for positive and negative examples, they do play a role in the training phase. If the weight distribution gets too uneven toward either positive of negative examples, one of these classifiers will get selected and then examples will get reweighted so that unevenness is reduced. The classifier is not saved during training since it does not affect the classification performance.

The method for learning a NAND or XOR-classifier will now be described. These classifiers are constructed by combining a subset of the weak classifiers that were already selected, i.e. at round t of boosting there are t–1 weak classifiers to select from.

The most direct approach to selecting the optimal classifier would be to evaluate all possible such classifiers and select the best one. However, there are $2^{t-1}-(t-1)-1=2^{t-1}-t$ possibilities, which is all subsets of cardinality $\geq 2$ of previously learnt weak classifiers. So exhaustive enumeration will in general be impossible. A reasonable strategy is to enumerate all small gated classifiers, i.e. enumerate all subsets containing $\leq n$ weak classifiers, where n is chosen so that exhaustive enumeration is possible.

It is also possible to incrementally extend a given NAND- or XOR-classifier. In the following a NAND-classifier will be used as an example, where it should be understood that the XOR-classifier case is analogous.

Figure 2A:
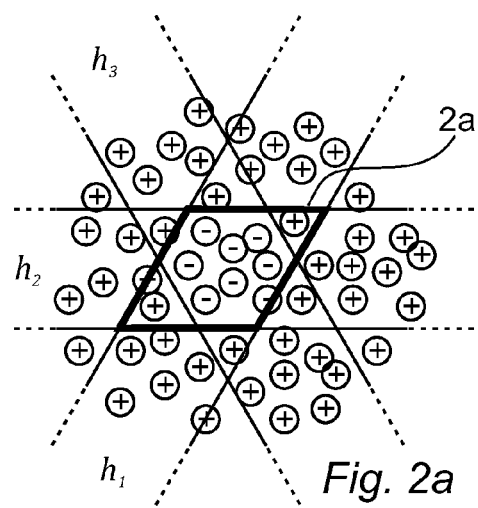
FIG. 2 shows schematically a two dimensional representation illustrating an incremental extension of a NAND-classifier.
Figure 2B:
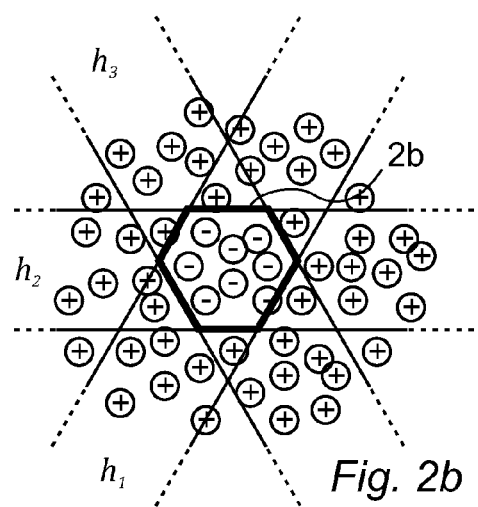

In FIG. 2 the region within the thick-lined frame, 2a, 2b, is classified as negative. With reference to FIG. 2, make the assumption that we have classifier $h_a(x) = \neg(h_1 \wedge h_2)$, which in a general method would be $h_a(x) = \neg(h_{j1} \wedge \ldots \wedge h_{jn})$, and let $I_a^- = \{i \in I | h_a(x_i) = 0\}$ be the set of all training examples that are classified as negative by $h_a$. Again with reference to FIG. 2, let $h_b(x) = \neg(h_1 \wedge h_2 \wedge h_3)$, which in the general method would be $h_b(x) = \neg(h_{j1} \wedge \ldots \wedge h_{jn} \wedge h_{jn+1})$, be the classifier we get by appending $h_{jn+1}$ to $h_a$ and let $I_b^- = \{i \in I | h_b(x_i) = 0\}$ be the set of all training examples that are classified as negative by $h_b$. Obviously $I_b I_a$. It is now possible to define the set of training examples that were classified as negative by $h_a$ but are classified as positive by $h_b$: $\Delta I^+ = I_a^- \setminus I_b^- = \{i \in I_a^- | h_{jn+1}(x_i) = 0\}$. All positive examples in this set will now get correctly classified while the negative examples will get incorrectly classified. The classification error thus changes as follows:

$$\Delta \epsilon = \Sigma_{\{i|x_j \in \Delta I^+, y_j = 0\}} D_t(i) - \Sigma_{\{i|x_j \in \Delta I^+, y_j = 1\}} D_t(i)$$

It is now possible to define a simple greedy method for learning large NAND- and XOR-classifiers. The first step of that method is to exhaustively enumerate all small NAND and XOR-classifiers, evaluate the classification error of each and select the best. The second step is to loop through all weak classifiers not already used and append the one that yields the smallest $\Delta \epsilon$. The third step is to continue appending more weak classifiers greedily as long as the best $\Delta \epsilon$ is negative. At each step, only the new classifier on the examples that were classified as negative by the previous classifier needs to be evaluated. The size of this set will be monotonically decreasing.

Below the whole AdaBoost algorithm including gated classifiers is described, to be compared to the previously described AdaBoost algorithm. The greedy weak learner will add a complexity term of $O(t^N)$ at round t of boosting, where N is the maximum size of the NAND or XOR classifier. Typically N=2 or N=3. At test time the input to the gated classifier will be the outputs of other weak classifiers that have already been evaluated, meaning that the only computation required to evaluate the gated classifier is the NAND or XOR operation itself.

Figure 3:
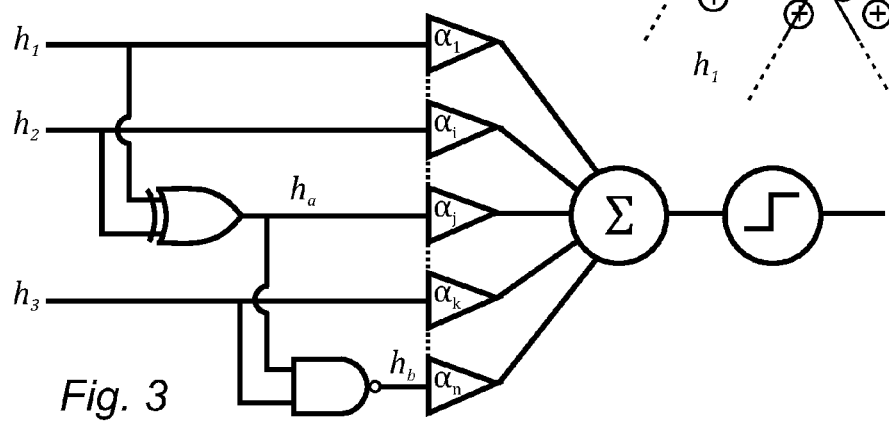
FIG. 3 shows a schematic and simplified illustration of a gated classifier constructed using at least one other gated classifier.
Figure 4:
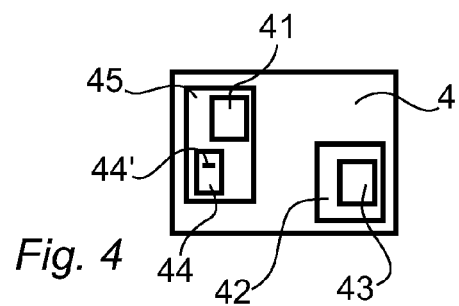
FIG. 4 shows a schematic and very simplified system according to the present invention.

The AdaBoost algorithm including gated classifiers is as follows:

Require: $\{(x_i,y_i)|i \in I\}$,T
Initialize $D_1(i) = 1/|I|$
for t = 1 to T do
   Train $h_t : \chi \to y$ using distribution $D_t$
   Train $h_{NAND} = \neg \wedge_{i \in I_1} h_j : \chi \to y$
     where $I_1 \subseteq, \ldots, t-1\}$
   Train $h_{XOR}(x) = \neg \wedge_{i \in I_2} h_j \wedge \vee_{i \in I_1} h_j : \chi \to y$
     where $I_2 \subseteq \{1, \ldots, t-1\}$
   $h_t^* \leftarrow$ the best of $h_t, h_\tau, h_\phi, h_{NAND}$ and $h_{XOR}$
   Choose $\alpha \in \mathbb{R}$
   $D_{t+1} \leftarrow$ update weight distribution
end for
return $\{\alpha_1, \ldots, \alpha_T\}, \{h_1^*, \ldots, h_t^*\}$ The learning algorithm may generate gated classifiers consisting of more than one gate. This happens when a gated classifier is constructed using at least one other gated classifier, which is illustrated in FIG. 3.

Here it can be seen that when boosting with gated classifiers, increasingly complex gate networks may be constructed. In this example $h_1$, $h_2$ and $h_3$ are basic weak classifiers, while $h_a$ and $h_b$ are gated classifiers, where $h_b$ uses $h_a$ as an input and is thus a compound gated classifier.

The final classification function in this example is:

$$H(x) = \alpha_1 \cdot h_1(x) + \alpha_i \cdot h_2(x) + \alpha_j \cdot h_a(x) + \alpha_k \cdot h_3(x) + \alpha_n \cdot h_b(x) + \ldots$$

where $h_a(x) = h_1(x) \oplus h_2(x)$ and $h_b(x) = \neg(h_a(x) \wedge h_3(x))$.

It should be understood that the present invention can be used in the training of separate detectors for different subsets of the target class or in the training of detector pyramids.

The inventive method can be used for different purposes; one example is image detection where the construction of image features that gives a good separation of the target class from the background is proposed.

The invention can be used in combination with the use of decision trees for the improvement of the weak classifiers or in combination with the selection of better thresholds for the improvement of the weak classifiers.

The present invention also relates to a system 4 for nonlinear classification of high dimensional data by means of boosting, which system is adapted to classify a target class with significant intra-class variation against a large background class, the system comprising a processor 41 adapted to use a boosting algorithm to produce a strong classifier where the strong classifier is a linear combination of weak classifiers. The present invention teaches that the system 4 is adapted to perform parts of or all of the inventive method as described above.

The inventive system 4 may comprise a hardware 42 adapted to manage the anti-correlated classifiers according the inventive method. Such hardware comprises one or several field programmable gate arrays 43, FPGAs.

A system according to the present invention can be a part of many different appliances, for instance, it can be a part of a camera or other ubiquitous equipment.

The present invention also relates to a computer program product 44 comprising computer program code 44' which, when executed by a computer 45, will enable the computer to perform parts of, or all of, the inventive method.

It will be understood that the invention is not restricted to the aforedescribed and illustrated exemplifying embodiments thereof and that modifications can be made within the scope of the invention as defined by the accompanying Claims.

The invention claimed is:

1. Method for nonlinear classification of high dimensional data by means of boosting, whereby a target class with significant intra-class variation is classified against a large background class, where the boosting algorithm produces a strong classifier, said strong classifier being a linear combination of weak classifiers,
   wherein weak classifiers that individually more often than not generate a positive on instances within said target class and a negative on instances outside of said target class, but that never generate a positive simultaneously on one and the same target instance, are categorized as a group of anti-correlated classifiers, and
   wherein the occurrence of anti-correlated classifiers from the same group will generate a negative.

2. Method according to claim 1, wherein a negative is generated if two anti-correlated classifiers occur for the same object.

3. Method according to claim 2, wherein weak classifiers $h_1$ and $h_2$ are categorized as anti-correlated classifiers, and wherein a new gated classifier $h_3$ is a so called paired gated classifier, where $h_3(x) = \neg(h_1(x) \wedge h_2(x))$.

4. Method according to claim 1, wherein a negative is generated if any subset of anti-correlated classifiers occur for the same object.

5. Method according to claim 4, wherein weak classifiers $h_{j1}$ to $h_{jn}$ are categorized as anti-correlated classifiers, and wherein a new gated classifier $h_{NAND}$ is a so called NAND-classifier, where $$h_{NAND}(x) = \neg(h_{j1}(x) \wedge \ldots \wedge h_{jn}(x))$$

and where $j_1, \ldots, j_n \in \{1, \ldots, t-1\}$ and t is the current round of boosting.

6. Method according to claim 4, wherein weak classifiers $h_{j1}$ to $h_{jn}$ are categorized as anti-correlated classifiers, and wherein a new gated classifier $h_{XOR}$ is a so called XOR-classifier, where $$h_{XOR}(x) = \neg(h_{j1}(x) \wedge \ldots \wedge h_{jn}(x)) \wedge (h_{j1}(x) \vee \ldots \vee h_{jn}(x))$$

and where $j_1, \ldots, j_n \in \{1, \ldots, t-1\}$ and t is the current round of boosting.

7. Method according to claim 1, wherein two trivial classifiers, here called the tautology classifier $h_T(x) = 1$ and the falsum classifier $h_\phi(x) = 0$, are defined, wherein said two trivial classifiers are used in a training phase, and wherein if the weight distribution gets too uneven toward either positive of negative objects, one of these classifiers will get selected and then objects will get reweighted so that unevenness is reduced.

8. Method according to claim 7, wherein said trivial classifiers are not saved during training.

9. Method according to claim 1, wherein separate detectors are trained for different subsets of said target class.

10. Method according to claim 9, comprising the training of detector pyramids.

11. Method according to claim 1, where said method is used for image detection, wherein the construction of image features gives a separation of said target class from the background.

12. Method according to claim 1, comprising use of decision trees for the improvement of said weak classifiers.

13. Method according to claim 12, comprising selection of thresholds for the improvement of said weak classifiers.

14. Method according to claim 1, wherein said method is used together with AdaBoost.

15. System for nonlinear classification of high dimensional data by means of boosting, said system being adapted to classify a target class with significant intra-class variation against a large background class, said system comprising a processor adapted to use a boosting algorithm to produce a strong classifier where said strong classifier is a linear combination of weak classifiers, wherein said system is adapted to perform the method of claim 1.

16. System according to claim 15, wherein said system comprises a hardware adapted to manage said anti-correlated classifiers according to claim 1.

17. System according to claim 16, wherein said hardware comprises one or several field programmable gate arrays.

18. System according to claim 15, wherein said system is a part of a camera or other ubiquitous equipment.

19. Non-transitory computer readable medium, comprising computer program code which, when executed by a computer, will enable said computer to perform the method of claim 1.

* * * * *